US010593167B2

(12) United States Patent
Gervais et al.

(10) Patent No.: US 10,593,167 B2
(45) Date of Patent: *Mar. 17, 2020

(54) CROWD-BASED HAPTICS

(71) Applicant: IMMERSION CORPORATION, San Jose, CA (US)

(72) Inventors: Eric Gervais, Montreal (CA); Shadi Asfour, Montreal (CA); Jamal Saboune, Montreal (CA); Amer Alhalabi, Laval (CA); Vincent Levesque, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,258

(22) Filed: Sep. 19, 2018

(65) Prior Publication Data

US 2019/0088093 A1 Mar. 21, 2019

Related U.S. Application Data

(63) Continuation of application No. 15/597,266, filed on May 17, 2017, now Pat. No. 10,083,578, which is a
(Continued)

(51) Int. Cl.
*G08B 6/00* (2006.01)
*G06F 3/01* (2006.01)

(52) U.S. Cl.
CPC ............... *G08B 6/00* (2013.01); *G06F 3/016* (2013.01)

(58) Field of Classification Search
CPC .................................. G08B 6/00; G06F 3/016
(Continued)

(56) References Cited

U.S. PATENT DOCUMENTS 9,691,238 B2 * 6/2017 Gervais .................... G08B 6/00
10,083,578 B2 * 9/2018 Gervais .................... G08B 6/00
(Continued)

FOREIGN PATENT DOCUMENTS

EP 2840463 A1 2/2015

OTHER PUBLICATIONS

Caroline Reid, "Scientists Create Holograms that you can Touch", IFL Science, last downloaded Oct. 14, 2015, http://www.iflscience.com/technology/scientists-create-holograms-you-can-- touch.
(Continued)

*Primary Examiner* — Kerri L McNally
(74) *Attorney, Agent, or Firm* — Medler Ferro Woodhouse & Mills PLLC

(57) ABSTRACT

A system produces haptic effects. The system receives input data associated with an event, identifies an element of the event in the input data, generates the haptic effects based on the element of the event, and produces the haptic effects via a haptic output device. In one embodiment, the haptic effects are generated by haptifying the element of the event. In one embodiment, the haptic effects are designed haptic effects and are adjusted based on the element of the event. In one embodiment, the input data is associated with a crowd that attends the event, and the element of the event is caused by the crowd. In one embodiment, the input data includes haptic data collected by one or more personal devices associated with the crowd. In one embodiment, the input data is indicative of a location of the one or more personal devices associated with the crowd.

14 Claims, 8 Drawing Sheets

Related U.S. Application Data continuation of application No. 14/882,683, filed on Oct. 14, 2015, now Pat. No. 9,691,238.

(60) Provisional application No. 62/198,615, filed on Jul. 29, 2015.

(58) Field of Classification Search
USPC .................................................. 340/407.1
See application file for complete search history.

(56) References Cited

U.S. PATENT DOCUMENTS

| | | | | |
|---|---|---|---|---|
| 2009/0128306 A1* | 5/2009 | Luden | ..................... | G06F 3/016 340/407.1 |
| 2010/0152545 A1 | 6/2010 | Ramsay et al. | | |
| 2012/0101604 A1* | 4/2012 | Segal | ..................... | H04N 5/765 700/92 |
| 2013/0343558 A1* | 12/2013 | Fox | ....................... | H04R 3/002 381/71.14 |
| 2014/0132547 A1* | 5/2014 | Adachi | ................ | G11B 19/025 345/173 |
| 2015/0302651 A1* | 10/2015 | Shpigelman | .......... | G06T 19/006 345/633 |
| 2015/0347827 A1* | 12/2015 | Dickinson | .......... | G06K 9/00302 382/103 |

OTHER PUBLICATIONS

Yoichi Ochiai et al., "Fairy Lights in Femtoseconds", Digital Nature Group, last downloaded Oct. 14, 2015, http://www.digitalnature.slis.tsukuba.ac.jp/2015/06/fairy-lights-in-femto- seconds/.

Guy Schofield et al., "Bootlegger: Turning Fans into Film Crew", Crowdsourcing Fans & Friends, CHI 2015, Crossings, Seoul, Korea, Apr. 18-23, 2015.

Communication pursuant to Article 94(3) EPC issued in European Application No. 16173311.6, dated Jun. 18, 2019.

Schofield et al., "Bootlegger: Turning Fans into Film Crew," Human Factors in Computing Systems, Apr. 18, 2015 pp. 767-776.

* cited by examiner

CROWD-BASED HAPTICS

CROSS REFERENCE TO RELATED APPLICATIONS

This application is a continuation of application Ser. No. 14/882,683 filed on Oct. 14, 2015, which claims priority of U.S. Provisional Patent Application Ser. No. 62/198,615, filed on Jul. 29, 2015, the disclosure of which is hereby incorporated by reference.

FIELD

One embodiment is directed generally to a haptic system, and in particular, to a haptic system that provides haptic effects related to an event.

BACKGROUND INFORMATION

"Haptics" relates to a tactile and force feedback technology that takes advantage of the sense of touch of a user by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

Haptics has been leveraged in recent technological advances to enhance the virtual experience of events such as live sports games, concert shows, fashion shows, comedy gigs, television episodes, etc. To that end, corresponding haptic effects may be delivered via various means, for example, via traditional media such as radio or television, via Internet based new media such as news streams and mobile applications, or via event virtual reality platforms such as the Oculus Rift head mounted display ("HMD") by Oculus Virtual Reality. While such technologies make it possible for a user to "attend" an event remotely via a virtual channel, they may not provide a full experience of the ambience of a live event as it would have been experienced when attending the event in person.

SUMMARY

One embodiment is a system that produces one or more haptic effects. The system receives input data associated with an event, identifies an element of the event in the input data, generates the one or more haptic effects based on the element of the event, and produces the one or more haptic effects via a haptic output device. In one embodiment, the haptic effects are generated by haptifying the element of the event. In one embodiment, the haptic effects are designed and are adjusted based on the element of the event. In one embodiment, the input data is associated with a crowd that attends the event, and the element of the event is caused by the crowd. In one embodiment, the input data includes haptic data collected by one or more personal devices associated with the crowd. In one embodiment, the input data is indicative of a location of the one or more personal devices associated with the crowd.

DETAILED DESCRIPTION

One embodiment provides haptics in content, or more specifically, haptics in live content (or pre-recorded content) to allow a user to experience the ambience of a live event or a pre-recorded event. One embodiment converts an input signal (e.g., an audio signal, a sensor signal, a signal input by a human operator, etc.) from a live media broadcast into a haptic signal that can be used to generate haptic effects to simulate the ambience of a live or pre-recorded event. In one embodiment, the haptic signal corresponds to crowd key elements (e.g., crowd mood, cheers, boos, etc.) or event elements observed by the crowd (e.g., game intensity level, game events, etc.). One embodiment uses haptic data collected by personal devices of the crowd and uses that in providing remote haptic feedback. Accordingly, by delivering haptic effects that simulate the experience of being physically present in a live event, embodiments provide an improved virtual experience of an event.

Figure 1:
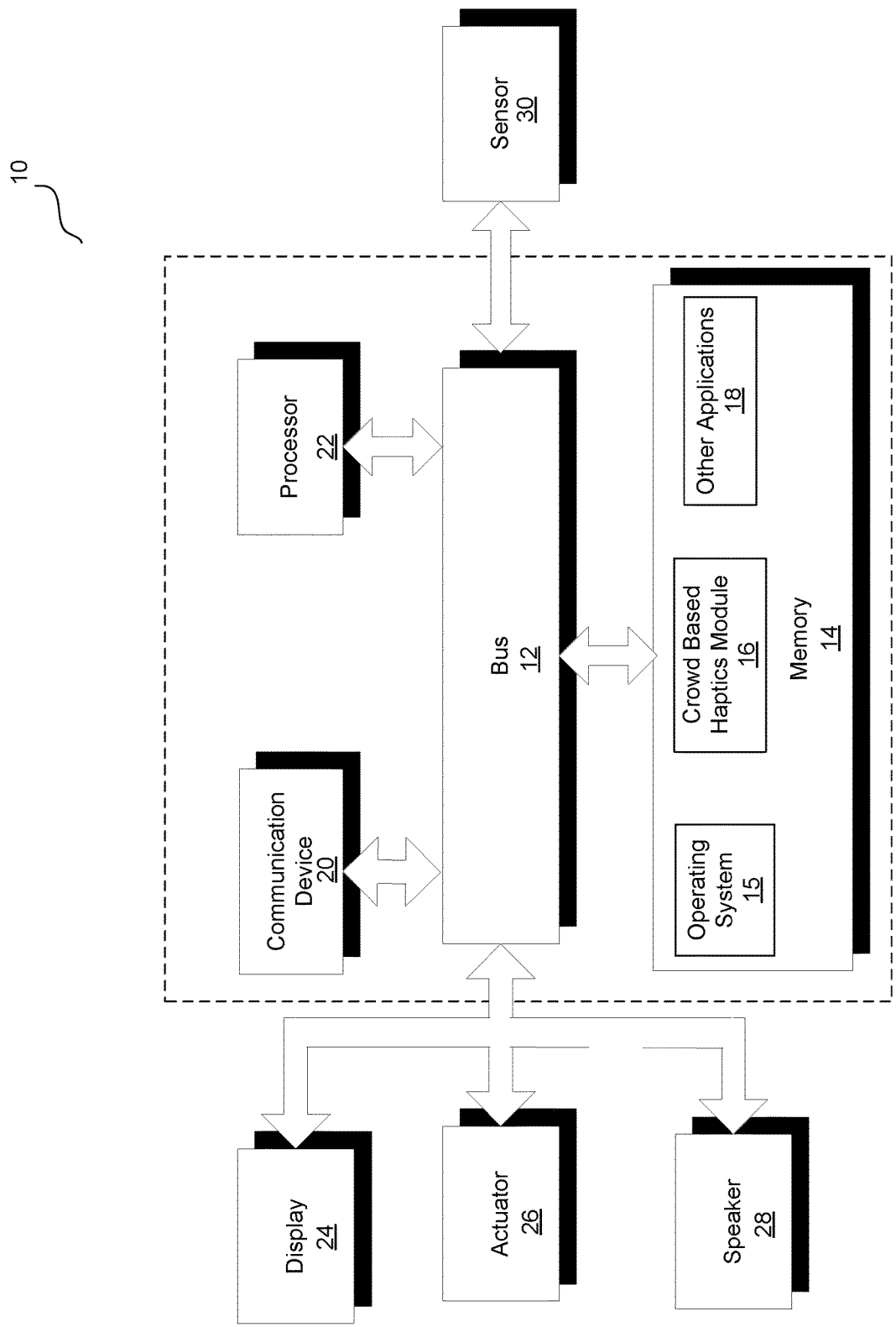
FIG. 1 is a block diagram of a computer server/system in accordance with an embodiment of the present invention.

FIG. 1 illustrates a block diagram of a system 10 in accordance with one embodiment of the invention. In one embodiment, system 10 is part of a mobile device, and system 10 provides haptic conversion functionality for the mobile device. In another embodiment, system 10 is part of a device that is incorporated into an object in contact with a user in any way (e.g., furniture), and system 10 provides haptic conversion functionality for such device. For example, in one embodiment, system 10 is part of a wearable device, and system 10 provides a haptic conversion functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides the haptic conversion functionality for the device.

Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules, or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a crowd based haptics module 16 that provides haptic functionality, as disclosed in more detail below. In certain embodiments, crowd based haptics module 16 can comprise a plurality of modules, where each module provides specific individual functionality for providing haptic effects. System 10 will typically include one or more additional application modules 18 to include additional functionality, such as Integrator™ software by Immersion Corporation.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

Processor 22 is further coupled via bus 12 to a display 24, such as a Liquid Crystal Display ("LCD"), for displaying a graphical representation or user interface to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, or an electroactive polymer ("EAP") actuator. In alternate embodiments, system 10 can include one or more additional actuators, in addition to actuator 26 (not illustrated in FIG. 1).

Actuator 26 is an example of a haptic output device, where a haptic output device is a device configured to output any form of haptic effects, such as vibrotactile haptic effects, electrostatic friction haptic effects, deformation haptic effects, etc., in response to a drive signal. Accordingly, in alternate embodiments, actuator 26 can be replaced by some other type of haptic output device (not shown) that may be a non-mechanical or a non-vibratory device such as a device that uses electrostatic friction ("ESF") or ultrasonic surface friction ("USF"), a device that induces acoustic radiation pressure with an ultrasonic haptic transducer, a device that uses a haptic substrate and a flexible or deformable surface or shape changing device and that may be attached to a user's body, a device that provides projected haptic output such as a puff of air using an air jet, a laser-based projectile, a sound-based projectile, etc.

For example, one embodiment provides a laser-based projectile where laser energy ionizes air molecules in a concentrated region mid-air to provide plasma (a concentrated mixture of positive and negative particles). In one embodiment, the laser may be a femtosecond laser that emits pulses at very fast and very intense paces, and the faster the laser, the safer for humans to touch. The projectile may appear as a hologram that is haptic and interactive. When the plasma comes in contact with user skin, the user may sense the vibrations of energized air molecules in the concentrated region. Sensations on the user skin are caused by the waves that are generated when the user interacts with plasma in mid-air. Accordingly, haptic effects may be provided to the user by subjecting the user to such concentrated region. Alternatively or additionally, haptic effects may be provided to the user by subjecting the user to the vibrations generated by directed sound energy.

Further, in other alternate embodiments, system 10 may not include actuator 26 or any other haptic output device, and a separate device from system 10 includes an actuator or another haptic output device that generates the haptic effects, and system 10 sends generated haptic signals to that device through communication device 20.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker. In alternate embodiments, system 10 can include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 can be configured to detect a form of energy, or other physical property, such as, but not limited to, sound, movement, acceleration, physiological signals, distance, flow, force/pressure/strain/bend, humidity, linear position, orientation/inclination, radio frequency, rotary position, rotary velocity, manipulation of a switch, temperature, vibration, or visible light intensity. Sensor 30 can further be configured to convert the detected energy, or other physical property, into an electrical signal, or any signal that represents virtual sensor information. Sensor 30 can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), a microphone, a photometer, an altimeter, a biological monitor, a camera, or a light-dependent resistor.

In alternate embodiments, system 10 can include one or more additional sensors, in addition to sensor 30 (not illustrated in FIG. 1). In some of these embodiments, sensor 30 and the one or more additional sensors may be part of a sensor array, or some other type of collection of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device can then send the converted signal to system 10 through communication device 20.

Generally, with known systems, a user may remotely and virtually attend an event or view a pre-recorded event while receiving corresponding haptic sensations. For example, motion systems provided by D-BOX Technologies Inc. provide motion effects in synchronization with specific visual content to allow for a more realistic experience of the visual content by a viewer. Such motion systems use the low frequency audio content of a media clip, or use human authoring, to create the haptic effects. Some other known systems such as the "Buttkicker" system by the Guitammer Company produce haptic effects that enhance the visual/audio effects felt by a remote user. The Buttkicker system uses low frequency audio content as well as sensors in the stadium to capture the elements of a gameplay. Some other known systems such as the "Fanmode" application by Fanmode Company allow a remote user to take part in the stadium interactions of a live sports game by relaying feedback of the remote user (e.g., waving hands, screaming, etc.) back into the stadium. With these known systems, while a user can remotely and virtually attend a live event or a pre-recorded event, he/she at least partially misses the experience of the ambience of the event that would have been experienced by a user that attends the event in person.

In contrast to the known systems, some embodiments of the present invention provide haptic feedback that captures elements corresponding to the ambience of an event (e.g., sports events, concerts, shows, etc.) such as dramatic moments and crowd mood (e.g., crowd energy, tension, cheering, etc.). Embodiments re-render this haptic feedback to a remote user. One embodiment performs crowd mood inference based on audio, video, and/or sensor signals, or based on data entered by a viewer or attendee of the event, and then provides haptic feedback corresponding to the inferred crowd mood. A further embodiment uses haptic data collected by personal devices of the crowd and uses that in providing remote haptic feedback. Accordingly, when a user cannot attend an event in person (e.g., because the event is remote or because the event happened in the past), embodiments provide haptic feedback that captures more than the audio/visual recorded content of the event so that the user can see, hear, and also feel what a real attendee would see, hear, and feel.

In one embodiment, data related to the crowd and/or the event is captured and then analyzed to detect relevant moments and key elements that can be haptically provided to a remote user. Such elements may include, for example, the crowd cheering, booing, chanting at a specific rhythm, shouting at the referee, tapping with their feet, applauding, etc. In one embodiment, these key elements are inferred from captured audio signals (e.g., from the main audio feed of the event, from the audio feeds dedicated to the crowd, from audio or video data recorded by personal devices of the crowd, etc.). In one embodiment, audio event detection may be performed as described, for example, in U.S. patent application Ser. No. 14/078,445, the disclosure of which is incorporated herein by reference in its entirety.

In one embodiment, once a key element is detected, it is haptified by using designed effects (e.g., based on a lookup table of designed effects stored in a database) that can be tuned to match the key element characteristics (e.g., intensity, length, etc.). In additional or alternative embodiments, an identified key element is haptified by using an audio to haptics conversion algorithm as described, for example, in U.S. patent application Ser. No. 14/078,442, U.S. patent application Ser. No. 14/078,445, U.S. patent application Ser. No. 14/020,461, and/or U.S. patent application Ser. No. 14/020,502, the disclosure of each is incorporated herein by reference in their entirety.

In one embodiment, other crowd elements may be captured via sensors placed at the live event and/or sensors within or attached to personal devices of the crowd. For example, crowd elements such as people standing up, leaving the event, sitting for a period of time, etc., may be captured via pressure sensors installed on, under, or around the crowd seats. Alternatively or additionally, such crowd elements may be captured and/or identified based on signals captured via personal devices of the crowd. For example, smartphones of the crowd may be used to measure signals indicative of the activity of the crowd such as acceleration, deformation, etc. In another example, smartphones of the crowd may be used to record audio or video signals indicative of the activity of the crowd.

In an alternative or additional embodiment, various sensors placed at the live event and/or within or attached to personal devices of the crowd may be used to sense haptic information related to the event, such as vibrations caused by a source on a stage, vibrations caused by a race car that drives by, etc. Accordingly, crowd elements such as the crowd mood may be derived based on signals provided by these haptic sensors alone, or in combination with signals from other sensors/devices/sources described herein. In one embodiment, estimates of the crowd mood may be inferred from each individual signal or from multiple groups of signals, and the crowd mood may then be determined by polling the estimated crowd moods. For example, in one embodiment, if the polling indicates that 80% of the crowd senses strong haptic effects (e.g., due to a race car passing by at a certain time), then the crowd mood is determined as "excited." Alternatively, signals received from multiple sources may be merged/fused first and then the crowd mood may be inferred from the merged/fused signals.

In one embodiment, such crowd information (e.g., activity of the crowd) as well as data describing player or performer movements (e.g., accelerations, speed, etc.) and the crowd audio feed (and/or audio data captured by personal devices of the crowd) may be used to infer event characteristics such as the mood of the crowd, the game/event dramatic intensity and climax, etc. In one embodiment, such event characteristics may be used to adjust the haptic effects created in association with the gameplay or the crowd. For example, in a hockey game, all haptic effects (e.g., haptic effects related to the players, gameplay, crowd, etc.) may be emphasized (i.e., provided with greater intensity) or reduced (i.e., provided with less intensity) given the intensity level of the game itself.

In one embodiment, detection of key elements such as the mood, intensity, and game events is performed using an artificial intelligence ("AI") based model such as neural networks, support vector machines ("SVMs"), Bayesian networks, etc. The AI based model receives the data from the sensors (e.g., pressure sensors, acceleration sensors, audio feeds, crowd personal devices, etc.), infers elements such as the most probable mood or intensity level that resulted in such data, and uses these elements to tune/adjust the haptic effects related to the game or event.

In an alternative or additional embodiment, the key elements (e.g., crowd cheering, booing, etc.) and/or the event characteristics (e.g., mood, intensity, etc.) are identified by an external observer/curator (i.e., a human operator). The commands of the external observer/curator and the characteristics of the key element (e.g., magnitude, duration, etc.) are then translated into haptic effects using a pre-configured lookup table that associates the key elements with corresponding pre-configured haptic effects. Alternatively or additionally, the identified key elements and event characteristics may be translated into haptic effects using a corresponding conversion algorithm that coverts audio or data into haptic effects.

In one embodiment, an event is watched live by the end user, and the audio and sensory data used to create the haptic effects, the haptic effects track itself, and/or the operator commands are transmitted in real time to an end user device. In alternative embodiments, the event is watched at a later time, and the audio and sensory data used to create the haptic effects, the haptic effects track itself, and/or the operator commands are stored along with the corresponding media content in order to be displayed/provided to the end user at a later time.

In one embodiment, haptic effects may be generated at different parts of the transmission chain of the event. For example, haptic effects may be generated at the user playback device using sensory/audio data or commands, or at a remote server that receives the data and the commands and then transmits the haptic effects to the end user device. Alternatively or additionally, haptic effects may be generated locally at the sensors and/or within the crowd personal devices. For example, some sensor platforms may have processing capabilities that enable them to locally detect event key elements and/or perform haptic effects conversion/tuning, such that only the generated/tuned haptic effects are transmitted from the sensor platforms. In an alternative or additional embodiment, a dedicated server located at the event venue may receive data from some or all sensors implemented at the venue and/or from some or all crowd personal devices, and then detect event key elements and/or perform haptic effects conversion/tuning.

In one embodiment, haptic effects related to the crowd or the event may be provided to a user on any haptic playback media. For example, haptic effects may be provided at mobile devices (e.g., tablets, smartphones, etc.), wearable devices (e.g., wristband, smart garment, etc.), actuator equipped furniture, haptically enabled head mounted displays ("HMDs" such as the Oculus Rift), etc. In these embodiments, the audio/video media content may be displayed on the same media that provides haptic effects, or on any other media with playback capabilities (e.g., a television).

In one embodiment, an end user can customize the haptic experience to his/her own taste using a haptic playback device user interface. For example, the end user may configure the haptic playback to emphasize some events, ignore some other events, etc. For example, in one embodiment, based on user preference to ignore a specific event, the haptic playback does not create a haptic effect when that event happens. In an alternative or additional embodiment, when a user indicates preference to ignore an event, the corresponding haptic effect is not transmitted or played back to the user. Similarly, based on user preference to emphasize a specific event, haptic effects related to that event are not displayed/provided to the user with a higher intensity when that event happens.

In one embodiment, an end user may configure the haptic playback to provide feedback associated with a certain location or point of view ("Pay") at the event. For example, based on user preferences, only a subset of data from sensors implemented at the venue and/or from crowd personal devices may be used to provide the haptic playback. For example, when the end user indicates preference for remotely experiencing the event as if being present at a certain location at the event venue, only data from sensors implemented at or around or associated with that location and/or data from crowd personal devices at or around that location is used to provide haptic feedback to the remote user.

In one embodiment, a user may watch a remote or pre-recorded event in a haptically enabled environment. For example, the user may watch the event in a haptically enabled room, may use a wearable haptically enabled device, may use a Virtual Reality ("VR") system (e.g., HMDs such as NextVR or Occulus Rift), etc. When an interesting event occurs during the event and corresponds to something that the user cares about (e.g., a hit during a hockey game), the system identifies that event (e.g., using sensors or through a curator) and transmits the event or a preprocessed version of the event to the user playback system to provide haptic effects corresponding to the event. Accordingly, the user "feels" the event through the haptic rendering system.

In one embodiment, different "types" of haptic effects may correspond to different types of events. For example, in one embodiment, different haptic effects can vary and be distinctive to let the user know that the crowd is excited or relaxed. In an additional or alternative embodiment, one type of haptic effects may be provided with respect to crowd key elements while a different type of haptic effects may be provided with respect to performer/player/gameplay events. In one embodiment, a haptic effect can be varied and thus distinctive from other haptic effects (i.e., different haptic effect types) by varying one or more parameters. In general, high level parameters that define a particular haptic effect include magnitude, frequency, and duration. Low level parameters such as streaming motor commands could also be used to determine a particular haptic effect. Some variation of these parameters can change the feel of the haptic effect, and can further cause the haptic effect to be considered "dynamic". Example types of haptic effects include vibration, jolt, detent, pop, etc., and parameters of each of these haptic effects may be changed to result in a different haptic effect. In one example, a first type of haptic effect can indicate a crowd key element (e.g., cheering, booing, etc.), while a second type of haptic effect can indicate a gameplay event (e.g., a score, a timeout, etc.). Further, different types of haptic effects can be used to indicate different information, such as the crowd cheering, the crowd booing, etc.

In one example, a user may be interested in a certain music band but may live too far from a location where the music band is scheduled for a live performance. The user may instead watch a live broadcast of the performance over the Internet while receiving haptic feedback that renders the intensity and energy of the scene. In one embodiment, the user may watch the performance in the comfort of his/her house, using a home theater system and a high definition television, while sitting on a haptic chair that provides haptic effects related to the performance. For example, the chair may shake at the most dramatic moments of the performance when the crowd chants in unison. In one embodiment, a haptic effect may be tuned/adjusted by changing a corresponding high level parameter (e.g., magnitude, frequency, duration, etc.), a corresponding low level parameter (e.g., streaming motor commands, etc.), or a variation or combination of these parameters to change the feel of the haptic effect, for example to cause the haptic effect to be considered "dynamic".

In one embodiment, when inferring the crowd mood, crowd elements such as the intensity of the event and the excitement of the crowd are determined, and corresponding haptic effects are tuned/adjusted accordingly. In one embodiment, parameters of a haptic effect corresponding to a key element may be tuned/adjusted according to the characteristics of the same key element or a different key element. For example, a haptic effect that renders the crowd mood may be tuned according to the intensity of the crowd mood elements and/or according to the intensity of a game or occurrence of a gameplay event.

In one embodiment, by determining certain events in an audio feed or other event related signal and haptifying only those parts that correspond to those events, an enhanced, targeted, and configurable haptic feedback is provided to a user. Further, since specific parts of the signals are haptified rather than the whole signal, embodiments may use haptic conversion algorithms configured for those parts of the signals and related to corresponding events to provide more accurate and enhanced haptic feedback.

Embodiments are applicable to any live or pre-recorded event. Embodiments are applicable to any audio/video representation of an event with a live crowd, where haptic effects are used to render the ambience of the event as felt by the live crowd.

In one embodiment, event signals such as audio, video, haptic, and sensory signals corresponding to the event or the live crowd may be obtained from user devices of the crowd, e.g., smartphones, wearable devices, physiological sensors, etc. For example, haptic signals of the event may be captured by crowd personal devices in the form of deformation, acceleration, vibration, audio, etc. In one embodiment, such user devices may communicate event signals via any communications medium such as the Internet, and haptic effects may be generated by obtaining the event signals from the communications medium. For example, in one embodiment, event signals may be captured via a crowd personal device (e.g., a microphone, a camera, an accelerometer, etc., which may be attached to or embedded within a smartphone of a person that attends the live event), or may be obtained from contact sensors, pressure sensors, or any physiological sensors associated with one or more users attending the event.

In one embodiment, the physiological sensors may measure signals indicative of event key elements such as the crowd mood. For example, the physiological sensors may include a blood pressure sensor or a temperature sensor that provides signals indicative of the level of excitement experienced by a person that attends the event. In one embodiment, other signals may be measured from the crowd body and may be used to obtain physiological signals that are indicative of crowd key elements. For example, a wearable device may be used to measure the heart rate of a person attending the event, and a rise in the heart rate may indicate a rise in the level of excitement at the event. Accordingly, a corresponding haptic effect may be provided to a remote user.

In one embodiment, user devices of the crowd may be polled to identify if a subset of the crowd is moving (e.g., if a number of the attendees are dancing or shaking), and the crowd mood may be inferred accordingly. In one embodiment, movement of the crowd may be measured via a sensor (such as an accelerometer, pedometer, etc.) configured within a wearable or a handheld user device. In one example, the crowd mood may be inferred as being excited if the number of attendees that are moving energetically is more than a threshold. In one embodiment, one or more attendees may allow crowd information to be collected via their user devices and/or wearables, and crowd information may be pulled only from those devices that are authorized by their users to share information.

In one embodiment, crowd key elements may be obtained/inferred via event information that is uploaded and/or shared by attendees via communication networks such as Twitter, Facebook, etc. In one embodiment, uploaded/shared event information related to a certain event is identified by observing event identifiers associated with the event such as a hashtag, location information, event name, event date/time, etc. In one embodiment, corresponding haptic effects for some event key elements are determined based off of one or more recordings associated with an event, and then such effects are re-used when rendering haptic effects for similar event key elements for the same event or for other events.

In one embodiment, when a user creates and shares a video of an event, the user is given the option to provide recommendations/suggestions for associating haptic effects with the video or with one or more portions of the video. In one embodiment, the user may select a haptic effect from a set of pre-recorded effects and associate that haptic effect with the uploaded/shared video or with one or more portions of the uploaded/shared video. In one embodiment, the user may further record haptic event information with the same device used for creating the video or with a different device, and share the haptic information as a haptic track associated with the video or as haptic information that may be used to create a haptic track associated with the video.

One embodiment uses a number of uploaded/shared videos of an event to generate haptic effects related to event key elements of the event captured by those videos. In one embodiment, such haptic effect is associated with future uploaded/shared videos that capture same or similar event key elements in the same or a different event. One embodiment uses captured haptic information of multiple crowd personal devices to generate a haptic track of the event and/or to generate haptic effects related to event key elements of the event captured by the haptic information.

In one embodiment, event key elements are inferred from event information that is uploaded/shared by the attendees and/or other remote viewers. In one embodiment, event key elements may be inferred by using data fusion functionality and/or correlating various sources of information such as audio feeds, video feeds, attendee/player/gameplay sensors configured at the event, uploaded videos of the event (e.g., videos that can be associated with the event based on a corresponding hashtag), comments made on uploaded videos that are indicative of an event key element (e.g., "the crowd is cheering!"), the timestamp of a certain comment made on an uploaded video, tweets related to an event and made at certain timestamps, information sourced by crowd personal devices, etc. In one embodiment, the aforementioned information is correlated and used to infer various events and/or create corresponding haptic effects.

In one embodiment, a number of uploaded/shared videos or haptic tracks of an event are processed to obtain a model of a certain event or a certain event key element. In one embodiment, such model is updated dynamically upon availability of new uploaded/shared videos or haptic tracks and is applied to future videos or haptic tracks to identify corresponding events or event key elements and potentially tune/adjust the model.

One embodiment provides a haptic playback system for a broadcasted live event, and haptic effects are provided to remote users that receive the broadcast of the live event. In one embodiment, the haptic playback system includes an end user device that receives separates signals for video data of the live event and haptic data corresponding to the video data, or receives a composite signal including the video data and the haptic data. The haptic data may include a direct haptic effect stream or a set of commands indicating which haptic effects must be performed.

Figure 2:
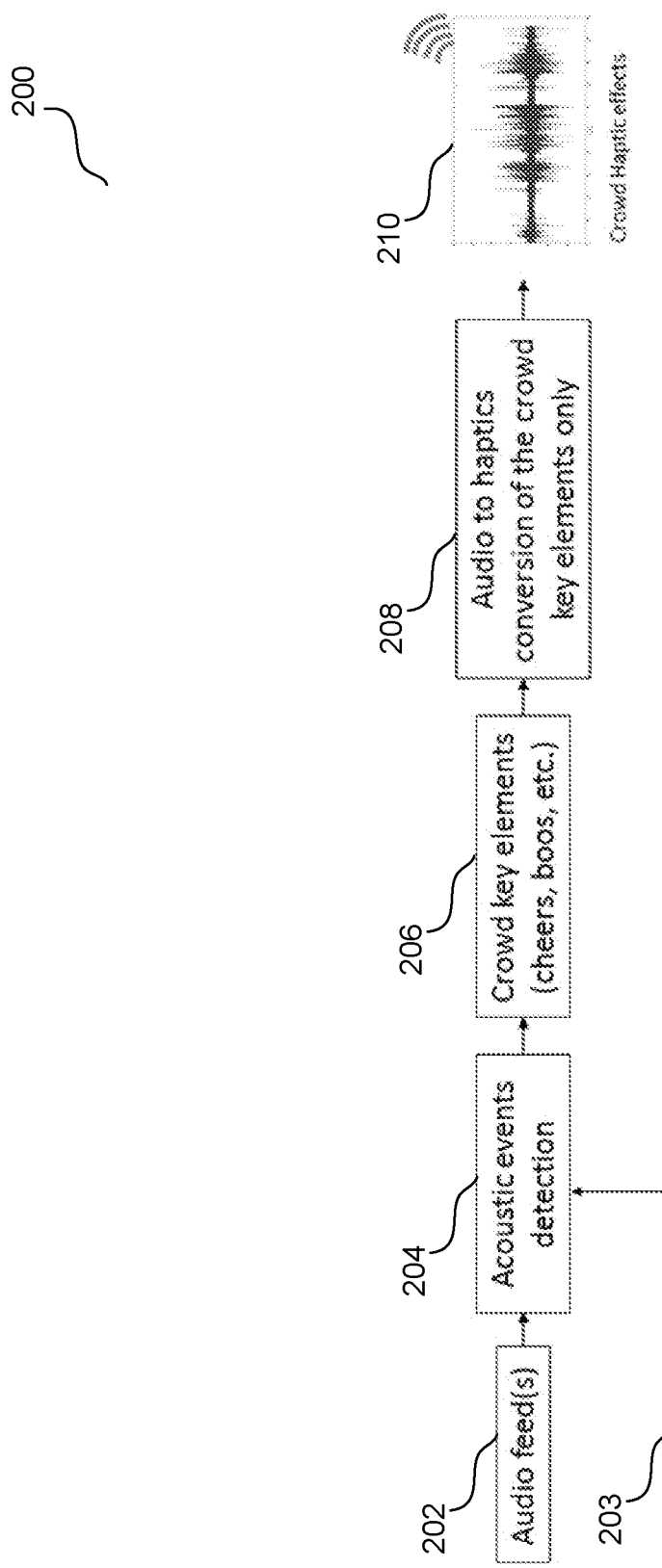
FIGS. 2-7 illustrate flow diagrams of haptics functionality performed by haptic systems according to embodiments of the present invention.

FIG. 2 illustrates a flow diagram of haptics functionality performed by a haptic system 200 according to an embodiment. At 202 one or more audio feeds of an event are received and at 204 acoustic (i.e., audio) events detection is performed on the received audio data. Alternatively or additionally, audio data may be received at 203 from one or more crowd devices (e.g., personal devices of the crowd that attends the event). Based on the audio events detection, at 206 key elements of the event are identified. In one embodiment, the key elements may correspond to crowd key elements such as cheers, boos, etc. At 208 audio to haptics conversion is performed only for the detected crowd key elements within the audio signal of the event, and at 210 corresponding crowd haptic effects are provided to an end user.

Figure 3:
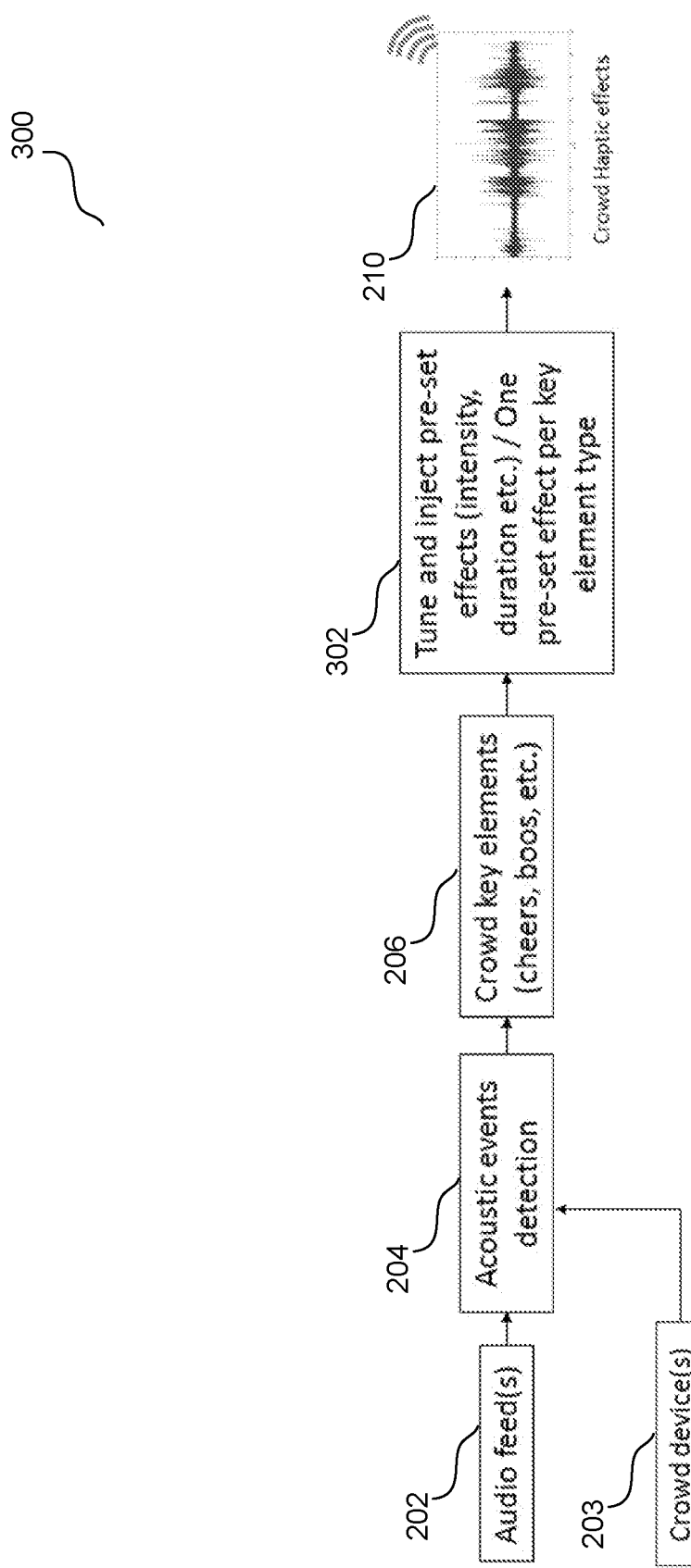

FIG. 3 illustrates a flow diagram of haptics functionality performed by a haptic system 300 according to an embodiment. Haptic system 300 performs the same functionalities at 202, 203, 204, 206, and 210 as in haptic system 200 of FIG. 2. However, in haptic system 300, once the crowd key elements are identified at 206, at 302 a pre-set effect is tuned and injected for each identified crowd key element. The pre-set effect may correspond to characteristics of a haptic effect that will be provided to a user in response to identifying a certain crowd key element. For example, for each identified crowd key element such as cheers, boos, etc., a pre-set effect such as intensity, duration, etc., may be determined, and a haptic effect with such pre-set effects is provided to an end user at 210.

Figure 4:
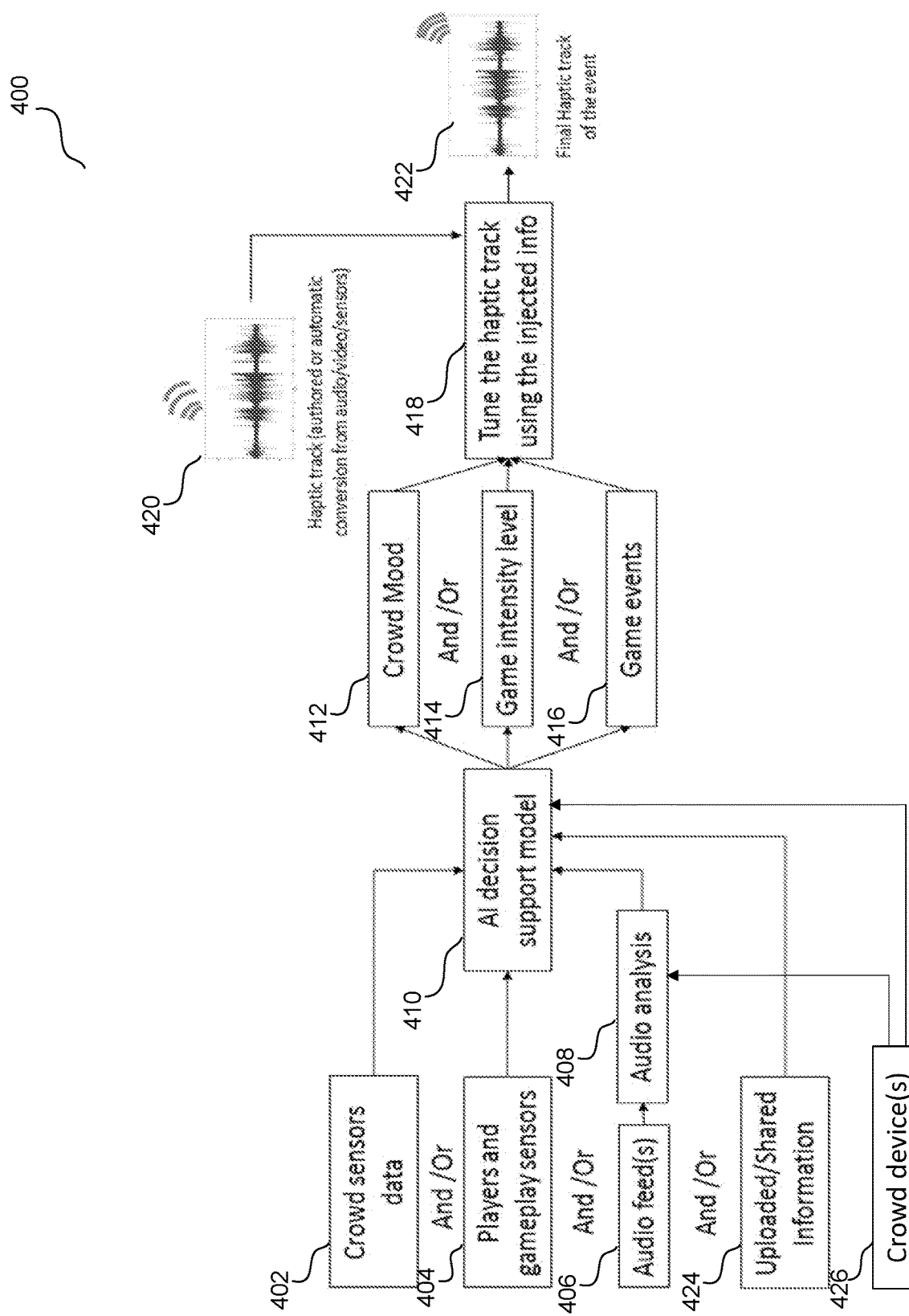

FIG. 4 illustrates a flow diagram of haptics functionality performed by a haptic system 400 according to an embodiment. At 402, 404, 406, 424, and 426, event information is received via crowd sensors and/or players/gameplay sensors and/or one or more audio feeds and/or uploaded/shared information and/or crowd devices, respectively. In one embodiment, crowd sensors may include pressure sensors placed on, under, or around crowd seats. In one embodiment, uploaded/shared information includes, for example, information shared by attendees of the event via their personal communication devices, information shared by viewers of the event on social networks, videos of the event uploaded on the Internet, tweets related to the event, comments on videos or tweets related to the event, etc. At 408 audio analysis is performed on the audio feed signals and/or audio data received from crowd devices. In one embodiment, audio analysis includes acoustic events detection. In an alternative embodiment, audio analysis includes detecting one or more audio attributes such as the audio feed average volume/intensity, a specific frequency range content, etc.

At 410 the event signals from 402, 404, 408, 424, and 426 are fed to an AI decision support model to identify various key elements. At 412, 414, and 416 event key elements such as crowd mood and/or game intensity level and/or game events are identified, respectively. At 418 the identified key elements are used to tune a haptic track obtained from 420. For example, in one embodiment, the identified key elements may be used to tune the intensity and duration of specific haptic effects in the haptic track. In one embodiment, the haptic track may be authored or may be obtained by conversion from audio/video/sensor/haptic information from the event. Finally, at 422 the tuned haptic track is provided to an end user.

Figure 5:
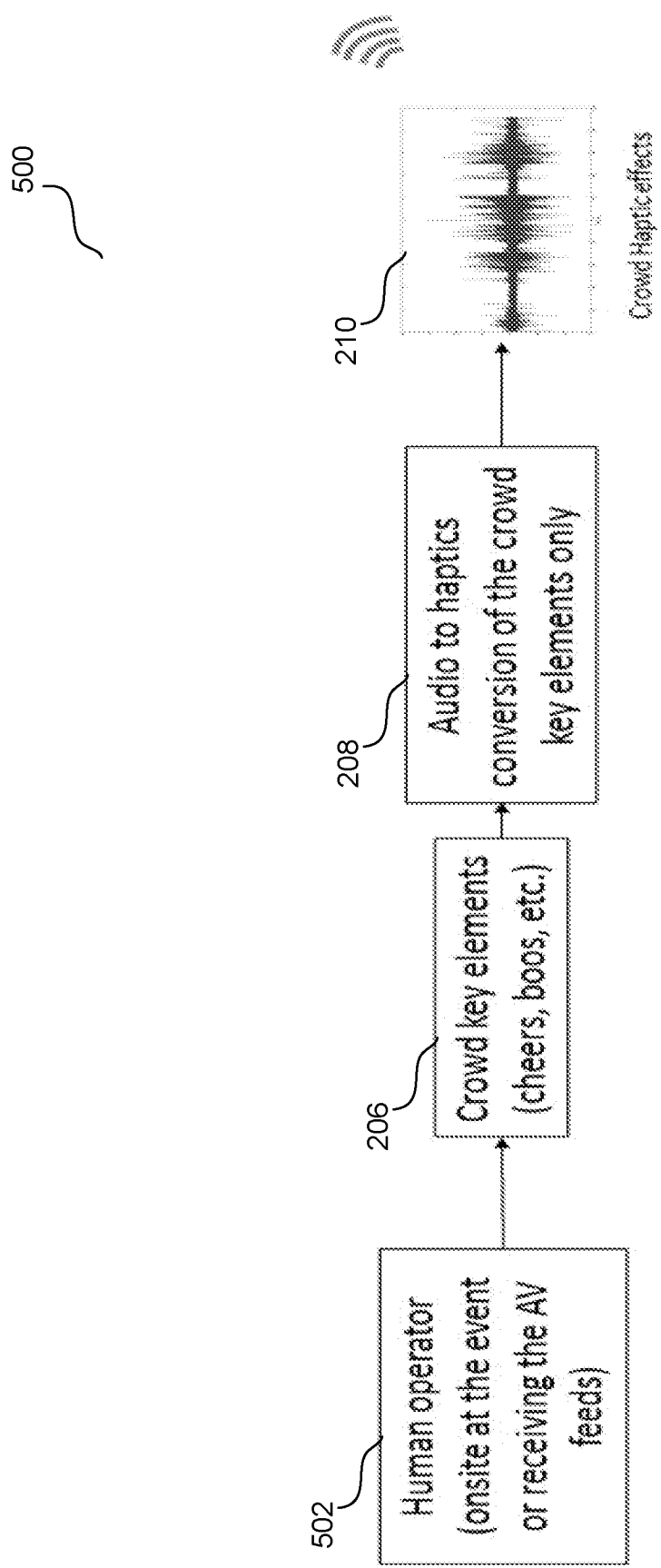

FIG. 5 illustrates a flow diagram of haptics functionality performed by a haptic system 500 according to an embodiment. Haptic system 500 performs the same functionalities at 206, 208, and 210 as in haptic system 200 of FIG. 2. However, in haptic system 500, at 502 event information is curated by a human operator and provided to 206. In one embodiment, the human operator may be onsite at the event or may be receiving audio/video feeds from the event. In one embodiment, the human operator provides feedback that flags events corresponding to crowd key elements such as cheers, boos, etc.

Figure 6:
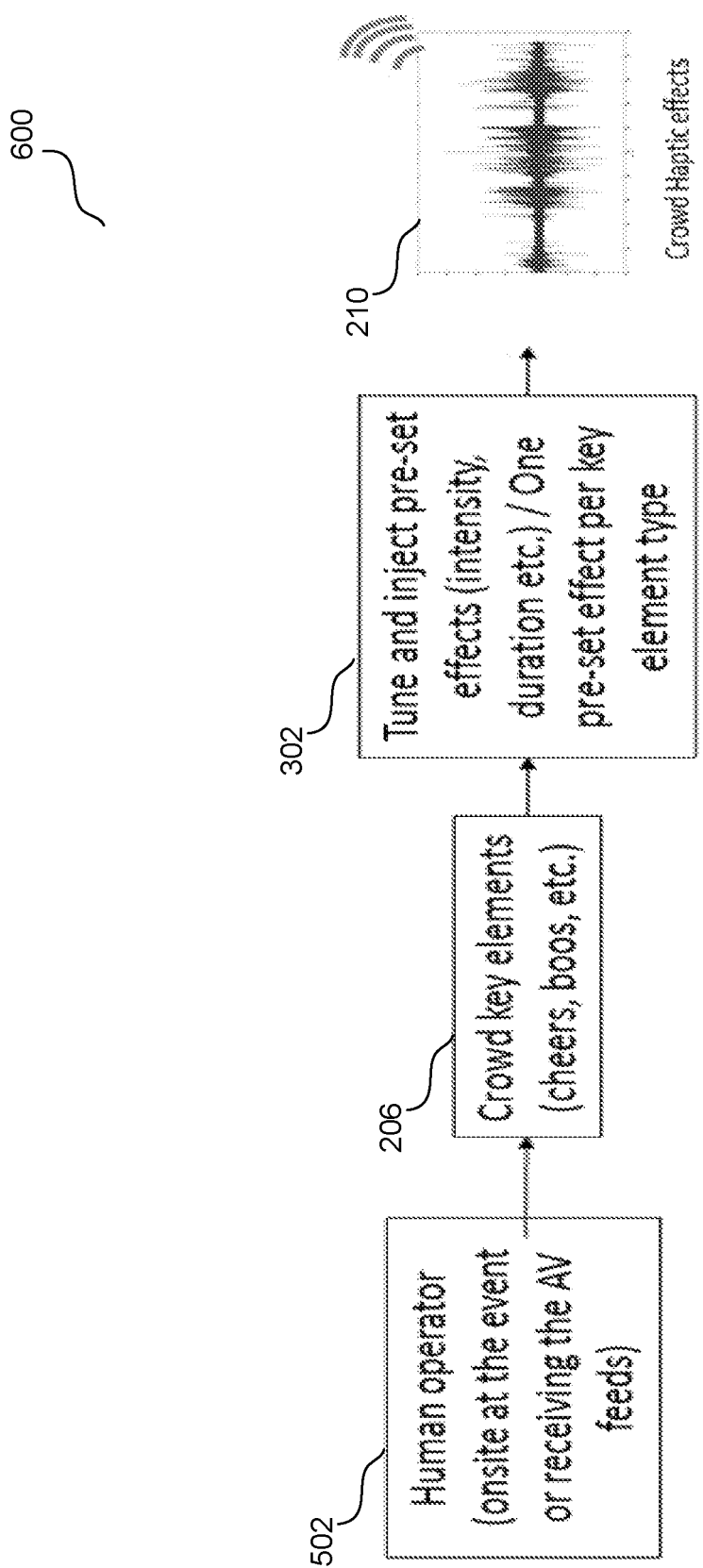

FIG. 6 illustrates a flow diagram of haptics functionality performed by a haptic system 600 according to an embodiment. Haptic system 600 performs the same functionalities at 502, 206, and 210 as in haptic system 500 of FIG. 5. However, in haptic system 600, once the crowd key elements are identified at 206, at 302 a pre-set effect is tuned and injected for each identified crowd key element as described herein with reference to FIG. 3, and a haptic effect with such pre-set effects is provided to an end user at 210.

Figure 7:
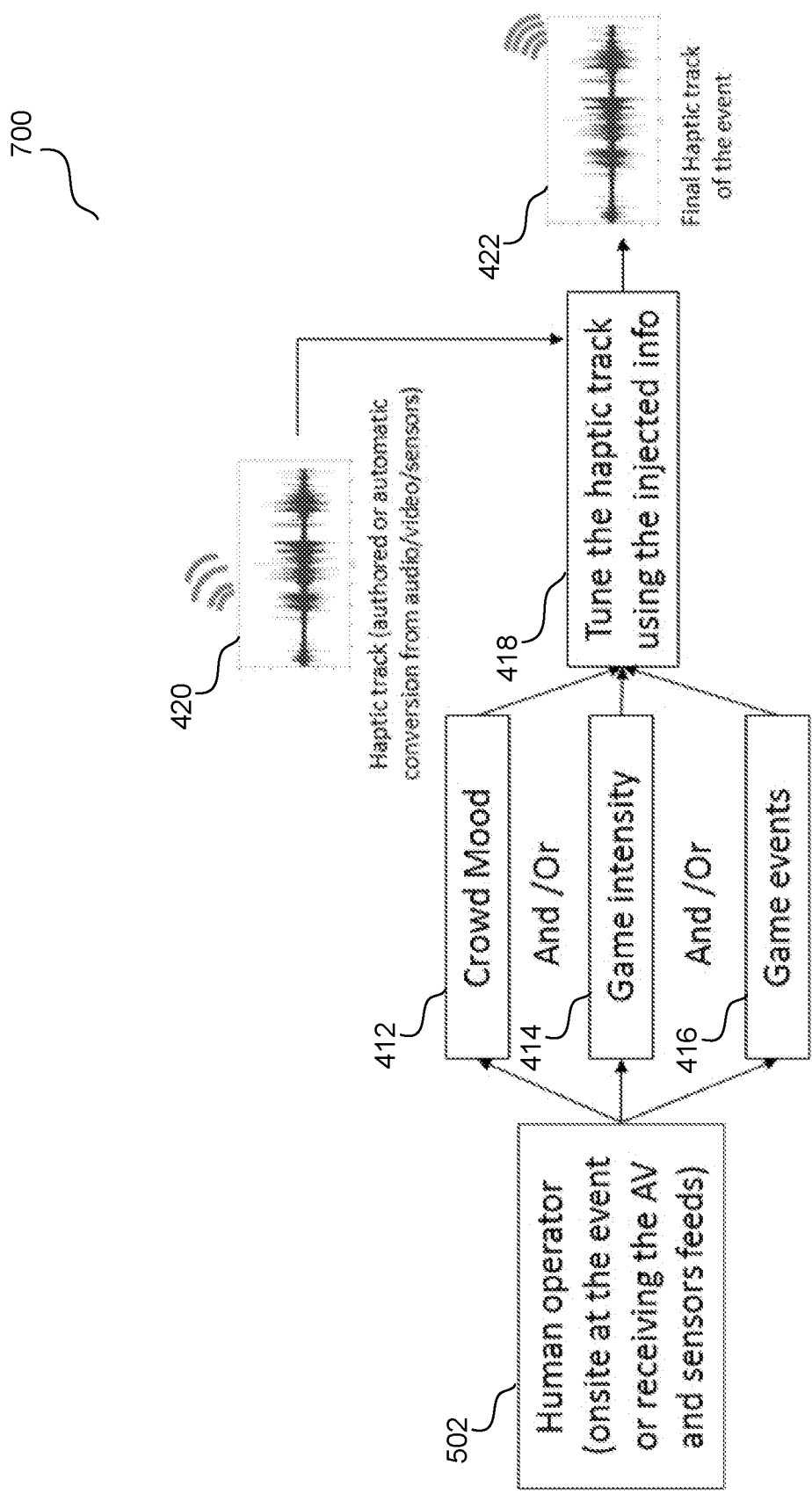

FIG. 7 illustrates a flow diagram of haptics functionality performed by a haptic system 700 according to an embodiment. Haptic system 700 performs the same functionalities at 412, 414, 416, 418, 420, and 422 as in haptic system 400 of FIG. 4. However, in haptic system 700, at 502 event information is curated by a human operator as described herein with reference to FIG. 5. Such event information is then used to identify event key elements in 412, 414, and 416.

One embodiment uses crowd personal devices (e.g., smartphones, wearable devices, etc.) to record a haptic track (e.g., vibrations) for later/remote playback along with a video track of the event. In one embodiment, the crowd is directed to associate a video/audio track with the haptic track recorded by a respective device. One embodiment may implement an array of haptic sensors at one or more of such crowd personal devices. One embodiment provides functionality for collecting and merging the vibration data generated by a large number of such devices present in the crowd (e.g., at a music concert, at a car race, etc.). The multiple recordings may be used to improve the quality of the haptic track and/or provide localized haptic data for playback in VR. Accordingly, if the sensors available in a single crowd user device cannot provide an accurate reproduction of a haptic experience, haptic data recorded by multiple crowd personal devices is used/merged to provide a better haptic track. This advantage is even more significant when it is expensive and difficult to deploy more accurate recording equipment. Further, multiple haptic track recordings may be necessary when haptic experience at different locations is desired to be reproduced, for example, in contexts such as VR.

In one embodiment, the sensors available on smartphone and wearable devices (e.g., tablets, smart watches, etc.) are used to generate a haptic track for audio-visual content. The sensors may include, for example, accelerometers, microphones, dedicated haptic recording devices (e.g., laser vibrometers, interferometry vibrometers), etc. Alternatively or additionally, haptic information may be derived based on video motion estimation (e.g., based on the change between successive frames captured by a smartphone or a wearable device). One embodiment further uses data captured by other devices distributed at the event such as professional devices that use the same sensor technologies as in consumer devices (e.g., accelerometers, microphones, laser vibrometers, etc.) but are more expensive and have better performance (e.g., better precision, resolution, signal-to-noise ratio, sampling rate, directionality, etc.).

One embodiment provides functionality for collecting haptic data from multiple user devices in a crowd (e.g., at a music concert, at a car race, etc.). The multiple recordings can then be merged, for example, in post-processing or in real-time. In one embodiment, the merged recording may be used to generate a haptic track with a higher quality than its constituent haptic tracks. For example, the multiple recordings may be averaged to reduce noise, or a subset of the multiple recordings may be selected as the best recordings and then averaged or merged. Alternatively, a data fusion algorithm may be used to merge the multiple recordings as will be described herein with reference to various embodiments.

In one alternative or additional embodiment, the merged recording may be used to generate one or more spatialized haptic tracks for context such as VR. The haptic tracks may then be associated with an audio-visual recording of the experience. In this embodiment, a haptic track may be generated by interpolating between a number of recordings related to the virtual position being simulated in VR. For example, the haptic track may be generated based on the recordings that are closest to the virtual position being simulated in VR, based on a number of recordings around the virtual position being simulated in VR, etc. In one embodiment, a model of propagation may be used to predict the haptic recording at a specific spatial location. For example, the model of propagation may be used to reconstruct the source of haptic feedback based on one or more haptic recordings, and then predict the haptic effect as it will be experienced at the specific spatial location.

One embodiment collects and merges recordings of several crowd personal devices by using a cloud service. For example, in one embodiment, each crowd personal device records a haptic track and communicates the recording to a server within a cloud service. The server then merges and/or averages the received recordings and provides that to a playback device of a remote user.

In one embodiment, various haptic tracks collected/recorded by various crowd personal devices are synchronized before being merged/averaged. For example, in one embodiment, each crowd personal device timestamps its recordings and the timestamps are used to synchronize the recordings of various crowd personal devices. In one embodiment, data collected by crowd personal devices is transferred to a server or central device for analysis, along with location information and metadata about the transferred recordings. The transferred data may include the timestamps to facilitate synchronization with other recordings so that embodiments may determine the timing relationship between various measurements recorded at various locations and/or by various devices/wearables/sensors.

One embodiment detects missing information (e.g., gaps) in the recordings received from crowd personal devices and directs members of the crowd that are participating in the recording towards spots with weak coverage/recordings or no coverage/recordings. One example of detecting missing information in the recordings received from the crowd and directing members of the crowd accordingly is disclosed in Schofield, et al., "Bootlegger: Turning Fans into Film Crew," CHI 2015 Proceedings of the 33rd Annual ACM Conference on Human Factors in Computing Systems, Pages 767-776 ("Schofield"). The directing of the crowd may be based on a desired location of the crowd (e.g., move to the left), a desired subject (e.g., shoot the singer or drummer), etc.

In one embodiment, the directing of the crowd is performed by providing feedback to the crowd (e.g., visual feedback, haptic feedback, etc.). One embodiment collects different types of recordings from the crowd, such as audio recordings, video recordings, haptic recordings, etc. For example, a crowd personal device may provide both a video recording and an associated haptic recording, and the haptic recording may be used to provide remote haptic feedback along with a playback of the video recording. In one embodiment, the directing of the crowd may be according to the preferences of a remote viewer of an event. For example, one or more live attendees of an event may serve as a proxy for a remote viewer of a broadcast of the event. For example, the remote viewer may determine which live haptic recording is to be forwarded for playback, based on a location of an attendee, a subject captured by the recording of an attendee, etc. In one embodiment, a remote viewer may alternatively or additionally select a player/performer to receive feedback from. For example, a remote viewer may select to receive haptic and/or other feedback captured by a sensor/device attached to a player of a soccer game, and the viewer may change the selection at a later time to get feedback from a different player and/or from a live attendee of the game.

In one embodiment, for example, a person in a crowd that is attending a concert may use an application on a personal device (e.g., a smartphone) to record a haptic track of the performance. The user may then re-experience the event at a later time by using Oculus Rift. For example, the person may virtually move through the crowd and feel the haptic experience change as if being present at the event.

In one embodiment, for example, a user may watch a car race event on their tablet, and as the race cars drive by, feel the vibrations as if being within the live crowd. Such vibrations may have been recorded by multiple crowd user devices (e.g., smartphones) at the race track. Accordingly, in broadcasting the event to be watched by the person, the best vibration recordings may be selected and provided based on the camera used at a certain time. For example, when the cameras are focused on a certain location in the race track, the vibration recordings from crowd personal devices that are close to that certain location and/or observing that certain location may be used to provide haptic feedback to the person that is watching the broadcast of the event.

In one embodiment, the crowd personal devices determine their position in the three dimensional space (i.e., provide spatial feedback). This may be performed via outdoor positioning systems such as the global positioning system ("GPS") or by implementing indoor positioning functionality such as detecting proximity Bluetooth beacons distributed in the space. One alternative or additional embodiment may estimate the relative position of different devices by having them communicate with one another (e.g., by WiFi Direct or Bluetooth) and estimating the signal strength. One alternative or additional embodiment may estimate the position of the devices based on other sensor signals such as images captured by a camera or the intensity of the sound captured by the device. For example, the location of a crowd personal device may be determined based on light intensity at that location in images captured by a camera. In another example, the location of a crowd personal device may be determined based on pattern recognition in images captured by a camera. In another example, the location of a crowd personal device may be determined based on sound intensity as captured by the device indicating the source of the sound and/or how far the device is from the stage.

In one embodiment, after various event data are collected (e.g., from different sensors at different locations at the event, from crowd personal devices, etc.), such data is fused into a coherent data set for later and/or remote playback. One embodiment fuses the collected data into a single haptic track that can be played back along with a corresponding audio-visual content, thereby providing a single POV feedback. An alternative or additional embodiment uses the collected data to produce a map of vibrations based on various locations at the event, thereby providing multiple POV feedback.

In one embodiment, in order to provide a single POV feedback, the collected data is combined such that an optimal resulting haptic track is obtained. The combining may be performed using any sensor fusion algorithm known in the art that perform data fusion based on, e.g., noise or variance of the signal recorded by each sensor/device, characteristics of each sensor (e.g., signal-to-noise ratio, recording quality rating, etc.), amplitude of the recorded signal, distance from the source of the recorded vibrations (e.g., the stage or speakers at a concert), etc. For example, in one embodiment, the sensor fusion functionality may obtain a weighted average of sensor signals, where the weights are based on the quality rating of each sensor.

One alternative or additional embodiment provides multiple POV feedback that maps the vibrations felt at various locations. This embodiment is applicable, for example, in a VR context where a user can look around and/or move in the space. It is also applicable in non-VR contexts where camera angles can be selected by the user that is receiving haptic feedback, and the haptic feedback is provided in association with the selected camera (e.g., different haptic tracks are provided for different video tracks). In this embodiment, the sensor fusion functionality may be as in the single POV scenario, but only applied to collected data that corresponds to certain locations at the event. For example, in order to provide haptic feedback corresponding to a specific location (e.g., a point in the space), one embodiment determines the best fusion of recordings from sensors/devices that are near that location (e.g., sensors/devices that are in a certain vicinity of that location). Accordingly, this embodiment provides a set of haptic tracks for some positions in space, from which a haptic track may be derived for any point in space (e.g., based on interpolation).

One alternative embodiment, however, may provide multiple POV feedback by using the collected data to determine a single fused haptic track and a map of the intensity of vibrations at various spatial locations. This embodiment produces haptic feedback for a certain spatial location based on the fused haptic track and the intensity of vibrations at that certain spatial location (e.g., by scaling the fused haptic track based on the measured or predicted intensity of vibrations at that certain spatial location).

One embodiment implements multiple actuators in providing haptic feedback. For example, one or more haptic feedbacks derived via the functionality described herein with respect to multiple POV feedback may be assigned to respective actuators of a device that has multiple actuators. This embodiment is applicable, for example, in providing playback on a tablet with actuators on the left and right side, providing playback through wearables on the left and right wrists of a user, etc. In one embodiment, the functionality described herein with reference to multiple POV feedback may be implemented to derive one haptic track per actuator. For example, based on data collected at the event by various sensors/devices at various locations, if stronger vibrations are sensed at the left side of a location of interest, the left-hand actuator of a tablet may provide a stronger playback vibration compared to its right-hand actuator.

In one embodiment, the haptic feedback is provided along with audio-visual and/or VR content. The audio-visual and/or VR content may be provided, for example, on a television, smartphone, tablet, VR headset, etc. The accompanying haptic feedback may be provided, for example, on a smartphone, a tablet, a wearable (e.g., smart watches), etc. In one embodiment, the haptic feedback may be according to any type of haptic stimuli described herein (e.g., vibrations, poking, squeezing, deformation, etc.) and is generated based on a mapping between the recorded vibrations and the respective haptic stimuli. For example, in one embodiment, the intensity of the recorded vibrations may be mapped to the intensity of deformations on a playback device. In one embodiment, the playback device receives the audio-video content along with the haptic data and plays them back in synchrony.

In one embodiment that provides the functionality described herein with reference to multiple POV feedback, a playback client may identify a haptic track for playback based on position/orientation of a remote user in a VR environment. For example, the playback client may identify the haptic track by linearly interpolating between the two nearest haptic data points provided by data fusion functionality.

One embodiment may implement an application on one or more crowd user devices that collects data from such devices. The application may also optionally provide guidance to improve the quality of the recordings performed via crowd user devices. For example, by performing at least part of sensor fusion functionality based on data that is already collected from sensors/devices at an event, one embodiment determines an estimate of the current quality of the recordings. If the estimate indicates that there is a gap in the recordings corresponding to inadequate or missing information related to a certain spatial location at the event, the application directs one or more users in the crowd to move towards the corresponding spatial location in order to improve the coverage of that area.

In one embodiment, user smartphones and/or wearables in a crowd at a concert are used to record vibrations. The recordings are then collected by a server and the collected data is processed to generate a high-quality haptic track that optimally combines all the recordings. Alternatively or additionally, the collected data is processed to generate a spatialized haptic track that reproduces the haptic experience at different locations in the crowd.

One embodiment provides data fusion functionality for fusing data collected from various sensors/devices at an event. In one embodiment, the sources of data may be redundant (e.g., two or more sources provide the same data), cooperative (e.g., fusion of data from two or more sources provides data that is more accurate than each source), or complementary (e.g., data from different sources corresponds to different parts of the environment), depending on the nature and distribution of the used sensors. The data fusion functionality may be according to, for example, Bayesian inference, maximum likelihood, least squares, Kalman filters, particle filters, ensemble methods, etc. Bayesian inference is a statistical inference in which Bayes' theorem is used to update the probability for a hypothesis as evidence is acquired. Bayesian inference may be Laplacian based, Gaussian based, etc. Maximum likelihood includes finding the value of one or more parameters for a given statistic which maximizes its likelihood distribution. The method of least squares is the process of finding the solution that minimizes the sum of the squares of the errors. Least squares may be performed as unscented, weighted, etc. Kalman filters use a series of measurements observed over time and including statistical noise and other inaccuracies, and produce estimates of unknown variables that are more precise than those that would be obtained based on a single measurement alone. Kalman filters may be extended, unscented, etc. Particle filters method is a sequential Monte Carlo methods based on point mass (or "particle") representations of probability densities. Ensemble methods use multiple learning algorithms to obtain better predictive performance that could be obtained from any of the constituent learning algorithms.

In one embodiment, the choice of the data fusion functionality may be based on data characteristics such as the number of recordings, the relative location of the recordings, the amount of noise in the recordings, the type of noise in the recordings (e.g., Gaussian, random, etc.), etc. For example, when different observations from different sources/recordings/devices with possibly various errors are used to predict the same variable (e.g., the vibration at a certain location), data from various sources may be input into a Kalman filter which, given a model of vibration propagation, can determine the best prediction of the valuable at a location that has no corresponding recording. In one embodiment, the observation that is input into a data fusion algorithm with reference to a specific recording may be the root mean square ("RMS") value of the recorded signal within a certain time period (e.g., a 5 ms window), the maximum value of the signal within a certain time period, etc. In one embodiment, each value delivered by one of the sensors/devices concerning the acceleration/vibration (e.g., a measured acceleration value) is considered as an observation of a corresponding state variable.

The data fusion functionality described herein may be implemented for any playback configuration such as providing a single POV feedback, providing multiple POV feedback, assigning one or more different haptic tracks to respective actuators of a device with multiple actuators, etc. In one embodiment, in order to provide multiple POV feedback and/or assign different haptic tracks to different actuators, for each sensor/device located in a specific area at an event, the corresponding readings are considered as observations of the state variable corresponding to that location. Depending on the type of the data fusion functionality used, one embodiment also applies a modeling of the evolution of the state variable over time. An evolution model may be an equation system that links the state variable values at time "t" to their values at time "t−1," and may depend on the data being used and the variables that are being estimated. One alternative or additional embodiment uses a data fusion functionality as described herein to estimate haptic information (e.g., the value of acceleration/vibration) in areas where no sensed/recorded information is available but related sensed/recorded information is gathered from sensors/devices available at a surrounding area.

In one embodiment that implements a Kalman filter for data fusion, in order to fuse the collected data into a single haptic track to provide a single POV feedback, each sensor/smartphone/device around a point P provides an observation of the state variable that is to be estimated, which is the vibration level at point P. Assuming that the process noise and the observation noise are both white Gaussian noises with known covariance matrices and the state variable follows a Gaussian distribution, the state variable evolves in time by the addition of the white noise. In this embodiment, the observation model also integrates the vibration propagation model that determines the vibration at a certain distance from the source of the vibration.

Figure 8:
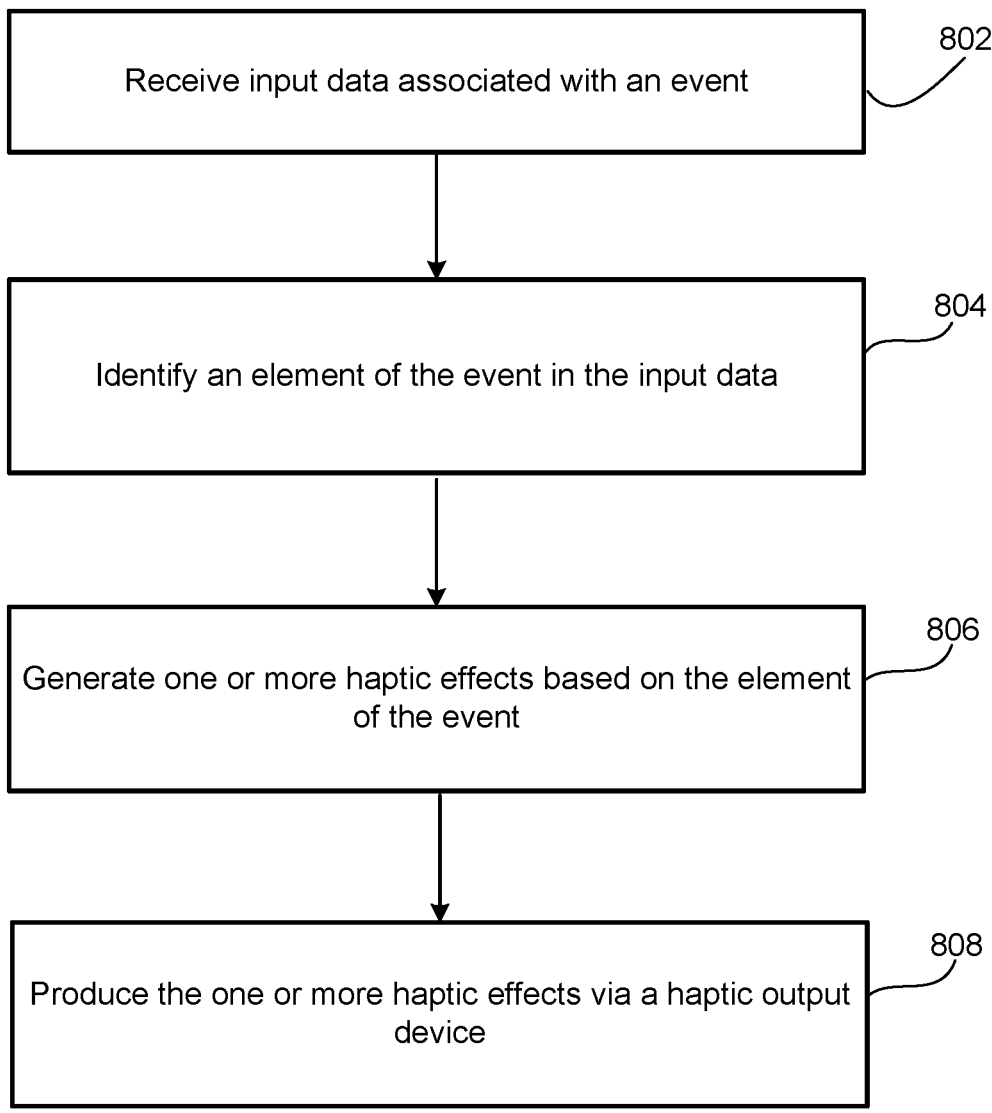
FIG. 8 is a flow diagram of the operation of the crowd based haptics module of FIG. 1 when performing haptics functionality in accordance with embodiments of the present invention.

FIG. 8 is a flow diagram of crowd based haptics module 16 of FIG. 1 when producing one or more haptic effects in accordance with embodiments of the present invention. In one embodiment, the functionality of the flow diagram of FIG. 8 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 802 crowd based haptics module 16 receives input data associated with an event. In one embodiment, the input data is originated from one or more of an audio feed, a video feed, a sensor, a human operator, a website, or a user device of an attendee of the event. In one embodiment, the input data is associated with a crowd that attends the event. In one embodiment, data associated with the crowd includes data sourced/generated by the crowd (e.g., cheers, boos, chants, etc.) and/or data that captures the event as experienced by the crowd (game intensity, mood, player performance, etc.).

At 804 crowd based haptics module 16 identifies an element of the event in the input data. In one embodiment, the input data is originated from two or more sources of data, and the element of the event is identified by correlating information in the two or more sources of data. In one embodiment, the element of the event is caused by the crowd. In one embodiment, the element of the event may correspond to crowd mood, such as the crowd being excited, agitated, dancing, etc. In one embodiment, the element of the event corresponds to a distinct crowd noise, such as cheering, booing, gasping, etc.

At 806 crowd based haptics module 16 generates one or more haptic effects based on the element of the event. In one embodiment, the generating of the one or more haptic effects may include adjusting the one or more haptic effects. In one embodiment, the one or more haptic effects are generated by haptifying the element of the event. In an alternative embodiment, the one or more haptic effects are designed haptic effects that are adjusted based on the element of the event. In one embodiment, the adjusting includes tuning a parameter (e.g., an intensity, a duration, etc.) of the one or more haptic effects based on the element of the event. In one embodiment, the one or more haptic effects are generated based on a different element of the event or based on a different input data associated with the event, where the different element of the event is obtained based on the input data or based on the different input data.

At 808 the one or more haptic effects are produced via a haptic output device. In one embodiment, the input data captures the experience of an attendee of the event located at a specific location and/or viewing the event from a specific POV/angle. Accordingly, such haptic effects help the user experience the event as if being located at such location and/or as if viewing the event from such specific POV/angle. In this embodiment, the haptic effects may be modified and/or adjusted based on a location/POV/angle selected by the user among various locations/POVs/angles at the event. In one embodiment, input data for providing haptic effects corresponding to each location/POV/angle is collected from the crowd present at that location/POV/angle and/or from sensors capturing event information at that location/POV/angle.

In one embodiment, the input data includes haptic data collected by one or more personal devices associated with the crowd that attends the event. In one embodiment, the input data further includes video or audio data collected by one or more personal devices associated with the crowd that attends the event. In one embodiment, the input data is indicative of a location of the one or more personal devices associated with the crowd that attends the event. In one embodiment, upon receiving the input data, crowd based haptics module 16 determines that the haptic data is missing haptic information associated with a location at the event and directs one or more of the crowd to move toward the location. In one embodiment, upon receiving the input data, crowd based haptics module 16 determines that the haptic data is missing haptic information associated with a performer at the event and directs one or more of the crowd to capture the haptic information about the performer.

In one embodiment, crowd based haptics module 16 generates a haptic track of the event based on the haptic data collected by the one or more personal devices associated with the crowd that attends the event. In one embodiment, crowd based haptics module 16 generates one or more haptic tracks associated with respective different locations at the event based on the haptic data that is collected by the one or more personal devices associated with the crowd that attends the event.

In one embodiment, crowd based haptics module 16 determines that a remote user indicates preference for receiving haptic feedback associated with a certain location at the event. In one embodiment, crowd based haptics module 16 selects, based on the preference, a haptic track within the one or more haptic tracks, and provides haptic feedback to the remote user based on the haptic track.

As disclosed, embodiments allow for a live event ambience to be experienced by a remote user. One embodiment captures event data (e.g., audio, video, sensory data, uploaded/shared event information, etc.) and analyzes the event data (either automatically or by a human operator) to identify event key elements to be haptified. One alternative or additional embodiment uses the captured data to obtain parameters used to tune haptic effects related to event key elements. Embodiments convert relevant captured data into haptic effects (either by automatic conversion or based on designed effects). One embodiment stores the data used to generate or tune the haptic effects, and/or the haptic effects track itself, so that the stored data and/or the haptic track can be provided to a user playback device at a later time. An alternative embodiment transmits the data used to generate or tune the haptic effects, and/or the haptic effects track itself, to a user playback device. The haptic effects are then provided to the end user along with the media content of a live or registered event. Accordingly, embodiments give the end user the possibility of better virtual immersion into the ambience of a remote or pre-recorded event.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A haptic-enabled device, comprising:
   a communication device;
   a display device;
   a haptic output device; and
   a processor configured
      to receive, via the communication device, a plurality of pieces of sensor data from a plurality of respective mobile devices that are located at an event, wherein the plurality of pieces of sensor data are captured by respective sensors of the plurality of respective mobile devices,
      to merge the plurality of pieces of sensor data into a haptic track by averaging the plurality of pieces of sensor data,
      to control the haptic output device to generate a haptic effect with the haptic track, and
      to control the display device to display video content captured from the event in synchronization with outputting of the haptic effect by the haptic output device.

2. The haptic-enabled device of claim 1, wherein the plurality of pieces of sensor data comprises a plurality of pieces of audio data captured by respective microphones of the plurality of respective mobile devices.

3. The haptic-enabled device of claim 1, wherein the plurality of pieces of sensor data comprises a plurality of pieces of vibration data captured by respective vibrometers of the plurality of respective mobile devices.

4. The haptic-enabled device of claim 1, wherein the haptic-enabled device is part of a virtual reality (VR) system.

5. The haptic-enabled device of claim 4, wherein the haptic-enabled device is a head-mounted device.

6. The haptic-enabled device of claim 1, wherein the haptic-enabled device is another mobile device.

7. The haptic-enabled device of claim 1, wherein the haptic-enabled device is a wearable device.

8. A haptic-enabled device, comprising:
   a communication device;
   a haptic output device; and
   a processor configured
      to receive, via the communication device, a plurality of pieces of sensor data from a plurality of respective mobile devices that are located at a plurality of respective locations at an event, wherein the plurality of pieces of sensor data are captured by respective sensors of the plurality of respective mobile devices,
      to determine that a haptic effect is to be generated at the haptic-enabled device, wherein the haptic effect corresponds to an additional location at the event different than the plurality of respective locations, and
      to select at least two pieces of sensor data from among the plurality of pieces of sensor data, wherein the at least two pieces of sensor data are received from mobile devices whose respective locations are, relative to other locations of the plurality of respective locations, closest to the additional location at the event, to interpolate the at least two pieces of sensor data to generate a haptic track, and to control the haptic output device to generate the haptic effect with the haptic track.

9. The haptic-enabled device of claim 8, further comprising a display device, wherein the processor is configured to control the display device to display video content captured from the event in synchronization with outputting of the haptic effect with the haptic output device.

10. The haptic-enabled device of claim 8, wherein the processor is configured to interpolate the at least two pieces of sensor data by determining a weighted average of the at least two pieces of sensor data by using respective weights that are based on quality ratings for the respective sensors of the plurality of mobile devices.

11. The haptic-enabled device of claim 8, wherein the haptic-enabled device is part of a virtual reality (VR) system.

12. The haptic-enabled device of claim 11, wherein the haptic-enabled device is a head-mounted device.

13. The haptic-enabled device of claim 8, wherein the additional location is determined based on a defined user preference.

14. A non-transitory computer readable medium having instructions stored thereon that, when executed by a processor of a server, causes the processor to receive a plurality of pieces of sensor data from a plurality of respective mobile devices that are located at a plurality of respective locations at an event, wherein the plurality of pieces of sensor data are captured by respective sensors of the plurality of respective mobile devices, to generate a plurality of haptic tracks corresponding to the plurality of respective mobile devices and the plurality of respective locations, to determine, for a haptic-enabled device that is not located at the event, a user preference that indicates which location from among the plurality of respective locations is preferred by a user of the haptic-enabled device, to select, based on the user preference, a haptic track from among the plurality of haptic tracks, wherein the haptic track that is selected corresponds to the location preferred by the user of the haptic-enabled device, and to transmit the haptic track that is selected to the haptic-enabled device.

\* \* \* \* \*